June 24, 1930. A. W. KATH 1,766,127
ROTARY RECIPROCATING VALVE FOR INTERNAL COMBUSTION ENGINES
Filed Sept. 13, 1926

Inventor
Alfred W. Kath
By Whittemore Hulbert Whittemore
Belknap
Attorneys

Patented June 24, 1930

1,766,127

UNITED STATES PATENT OFFICE

ALFRED W. KATH, OF DETROIT, MICHIGAN

ROTARY RECIPROCATING VALVE FOR INTERNAL-COMBUSTION ENGINES

Application filed September 13, 1926. Serial No. 135,227.

The invention relates to valves for internal combustion engines of the cylindrical sleeve type and the invention consists, first in the novel construction of the valve and its operating mechanism and, second in the arrangement of said valve in relation to the engine cylinders as hereinafter set forth.

Figure 1:
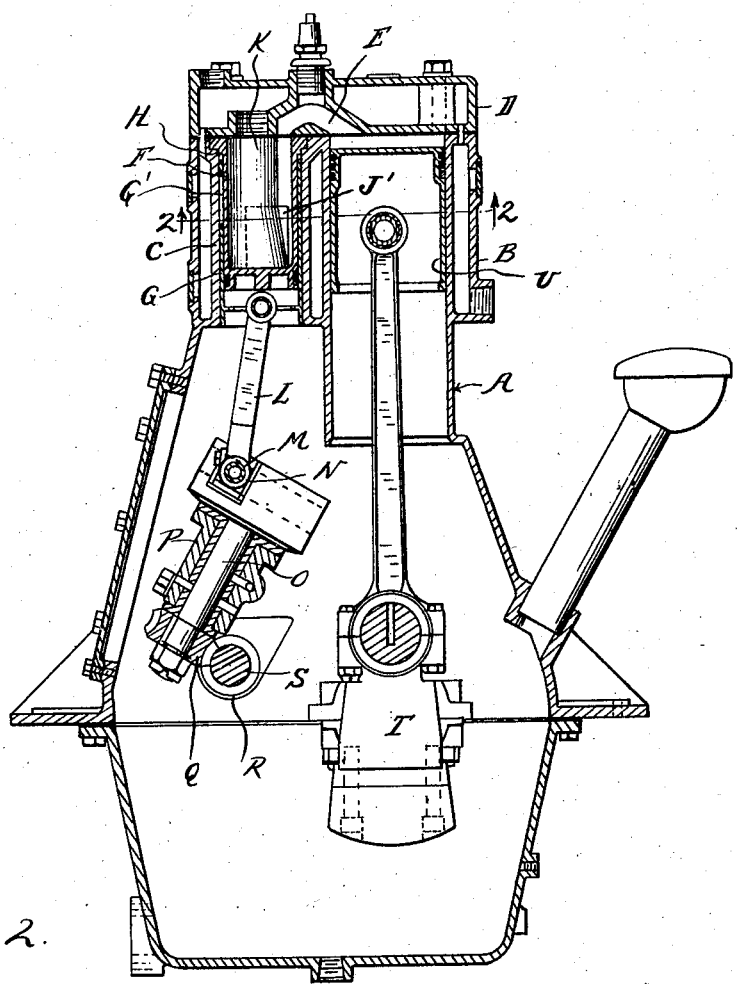
Figure 1 is a cross section through an internal combustion engine provided with my improved valve.
Figure 2:
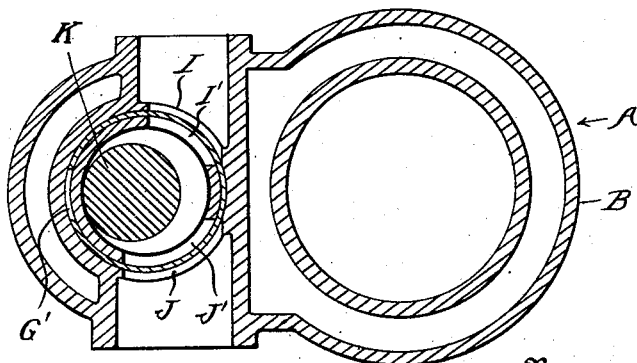
Figure 2 is a horizontal section on line 2—2 of Figure 1.

A is the engine block which may be either for a single or multi-cylinder construction and which is provided with the usual water jacket B. C is a cylindrical valve casing preferably integral with the block, and arranged at one side of and with its axis parallel to the axis of the power cylinder D is a removable head of the block which also is water jacketed and is formed with a passage E therein for connecting the upper ends of the engine and valve cylinders. F is a hollow core member inserted in the cylinder C but of a smaller diameter so as to leave therebetween an annular space for a cylindrical valve sleeve G. The core F has at its upper end a shouldered flange portion H for fitting into a corresponding annular recess in the cylinder C so as to accurately position the core in relation to the cylinder. I and J are respectively inlet and exhaust ports formed on opposite sides of the cylinder C and I' and J' are registering ports formed in the hollow core member F. These ports are so related as to obtain the desired timing on the opening of the inlet and exhaust as hereinafter described. K is a member secured to the head D and projected downward in the hollow core F being eccentrically arranged in relation thereto so as to provide greater clearance on the one side than on the opposite side thereof.

The sleeve valve G is adapted to rotate and reciprocate within the annular recess between the hollow core F and the cylinder C. This valve is actuated by mechanism comprising a pitman rod L secured at its upper end to the valve and at its lower end to a rotary crank M, revolvable about the axis of the cylinder C but in a plane oblique to said axis. The connection between the pitman L and the crank M is a universal pivotal joint N which permits the change in angularity during rotation of the crank. The crank M is mounted upon an obliquely inclined shaft O which is journaled in bearings P on the engine plane, said shaft being connected by the spiral gears Q and R, with a shaft S, which is parallel to the crank shaft T. The shaft S is driven by suitable connection with the crank shaft T and the ratio of the gearing is such that the crank M will complete one revolution in each two revolutions of the crank shaft.

With the construction as described, when the engine is running, the crank M and pitman L will impart to the sleeve G a combined rotational and longitudinal reciprocating movement. The sleeve is provided with a single port G' which is alternately carried into registration with the inlet ports I and the exhaust port J. Thus any heat communicated with the valve by the exhaust gases is dissipated when the cool gases enter through the inlet ports. This is also true of the hollow core member F and member K which are alternately exposed to the hot gases of explosion and the cool gases from the intake.

In operation the gases discharged from the intake is drawn into the engine cylinder during the suction stroke of the engine piston U and during the compression stroke is expelled from the cylinder through the port E into the hollow core F. The member K is of such form as to leave in the surrounding space together with the port E and clearance in the engine cylinder, just the required total clearance for obtaining the desired compression. During compression the heat which has been stored in the member K from a previous explosion is transferred to the compressed charge and insures the vaporization of the liquid fuel in the charge. On the other hand, after the explosion the heat which is communicated to the member K is partly dissipated by its connection to the water jacket in the head D and to facilitate such dissipation the member K is preferably formed of a good heat conducting material such as copper.

As has been stated the rotation of the crank M will impart to the sleeve G a combined rotary and reciprocating movement. The rotational movement will effect a registration of the port G' with the inlet and exhaust ports in properly timed relation while the reciprocating movement will insure proper distribution of the lubricant on the wall of the cylinder C and also uniform wear on the valve and cylinder. As the inlet and outlet ports I and J are on opposite sides of the cylinder C the pressure on the valve due to compression or explosion gaseous pressure will be substantially balanced. Thus the valve in operation will be free both from heat distortion and from any unbalanced pressure.

What I claim as my invention is:

1. In an internal combustion engine, the combination with a cylindrical valve chamber and a sleeve valve revoluble therein, of a crank revoluble about an axis oblique to the axis of said valve and a rod for connecting said crank and said valve sleeve to impart to the latter a combined rotary and reciprocating movement.

2. In an internal combustion engine, the combination with a power cylinder and a valve cylinder arranged parallel to each other, of a hollow core arranged concentrically within said valve cylinder leaving an annular space therebetween and having an open upper end, a head for closing both the power cylinder and valve cylinders provided with a passage establishing communication between the adjacent ends of said power cylinder and said hollow core, said valve cylinder and hollow core being provided with registering ports on opposite sides thereof respectively constituting the inlet and exhaust ports, a rotary sleeve valve in the annular space between said core and valve cylinder provided with a single port which is alternately registered with said inlet and exhaust ports.

3. In an internal combustion engine, the combination with a power cylinder and a valve cylinder formed in a single block having parallel axes, of a hollow core arranged concentrically within said valve cylinder to form an annular space between the walls thereof and being open at its outer end and having a shouldered seat on said cylinder, a head for closing both the power and valve cylinders provided with a passage for connecting the ends of the same, said valve cylinder and hollow core being provided with registering ports on opposite sides thereof respectively constituting inlet and exhaust ports, a sleeve valve engaging the annular space between said valve cylinder and hollow core and being provided with a single port for alternate registration with said inlet and exhaust ports and means for imparting to said sleeve a rotary and longitudinal reciprocating movement.

4. In an internal combustion engine, the combination with a power cylinder and a valve cylinder arranged parallel to each other, of a hollow core concentrically arranged within said valve cylinder to form an annular space between the walls thereof, said core and cylinder being provided with registering ports on opposite sides thereof respectively constituting inlet and exhaust ports, a head for closing both said power and valve cylinders provided with a passage for connecting the upper ends thereof, a valve sleeve in the annular space between said hollow core and valve cylinder being provided with a single port which is alternately registered with said inlet and exhaust ports and means for imparting to said sleeve valve a rotary and longitudinal reciprocating movement.

5. In an internal combustion engine, the combination with a power cylinder, of a cylindrical valve chamber communicating with said power cylinder and provided with ports connected to the inlet and exhaust, a sleeve valve having a single port adapted to alternately register with said inlet and exhaust ports, and a common means for effecting rotary and reciprocatory motion to said valve.

In testimony whereof I affix my signature.

ALFRED W. KATH.